US006992951B2

(12) United States Patent
O'Brien et al.

(10) Patent No.: US 6,992,951 B2
(45) Date of Patent: Jan. 31, 2006

(54) PERMANENT SEAFLOOR SEISMIC RECORDING SYSTEM UTILIZING MICRO ELECTRO-MECHANICAL SYSTEMS SEISMIC SENSORS AND METHOD OF DEPLOYING SAME

(75) Inventors: Thomas E. O'Brien, Sugar Land, TX (US); Magne Oldervoll, Os (NO); Leon Lovheim, Bergen (NO); Allen J. Bishop, Richmond, TX (US); William P. Campbell, Spring, TX (US); Ronald G. Schmidt, Spring, TX (US); Douglas S. Wheeler, Katy, TX (US); Geoffrey M. Nightingale, Katy, TX (US)

(73) Assignee: Input/Output, Inc., Stafford, TX (US)

( * ) Notice: Subject to any disclaimer, the term of this patent is extended or adjusted under 35 U.S.C. 154(b) by 50 days.

(21) Appl. No.: 10/668,911

(22) Filed: Sep. 23, 2003

(65) Prior Publication Data

US 2004/0156267 A1 Aug. 12, 2004

Related U.S. Application Data

(60) Provisional application No. 60/412,888, filed on Sep. 23, 2002.

(51) Int. Cl.
 *G01V 1/38* (2006.01)

(52) U.S. Cl. .......................................... 367/15; 181/112
(58) Field of Classification Search ................... 367/15, 367/5, 6, 20, 21, 56, 58; 166/339, 250.1; 181/110, 112; 702/14
See application file for complete search history.

(56) References Cited

U.S. PATENT DOCUMENTS

| 5,231,251 A | * | 7/1993 | Hackett ........................ 367/56 |
| 5,396,472 A | | 3/1995 | Paffenholz .................... 367/24 |
| 5,481,502 A | * | 1/1996 | Cretin et al. ................... 367/15 |
| 6,255,962 B1 | * | 7/2001 | Tanenhaus et al. .... 340/870.05 |
| 6,337,636 B1 | * | 1/2002 | Page et al. ..................... 367/21 |
| 2003/0128627 A1 | * | 7/2003 | Iseli et al. ..................... 367/60 |

\* cited by examiner

*Primary Examiner*—Ian J. Lobo
(74) *Attorney, Agent, or Firm*—Madan, Mossman & Sriram, P.C.

(57) ABSTRACT

Provided is a permanent seafloor seismic recording system utilizing Micro Electro-Mechanical Systems seismic sensors. The system includes and expandable backbone, multiple hubs and sensor lines. The sensor lines include multiple sensor modules that include 3-C accelerometers and a hydrophone for providing a 4-C sensor module output signal.

18 Claims, 5 Drawing Sheets

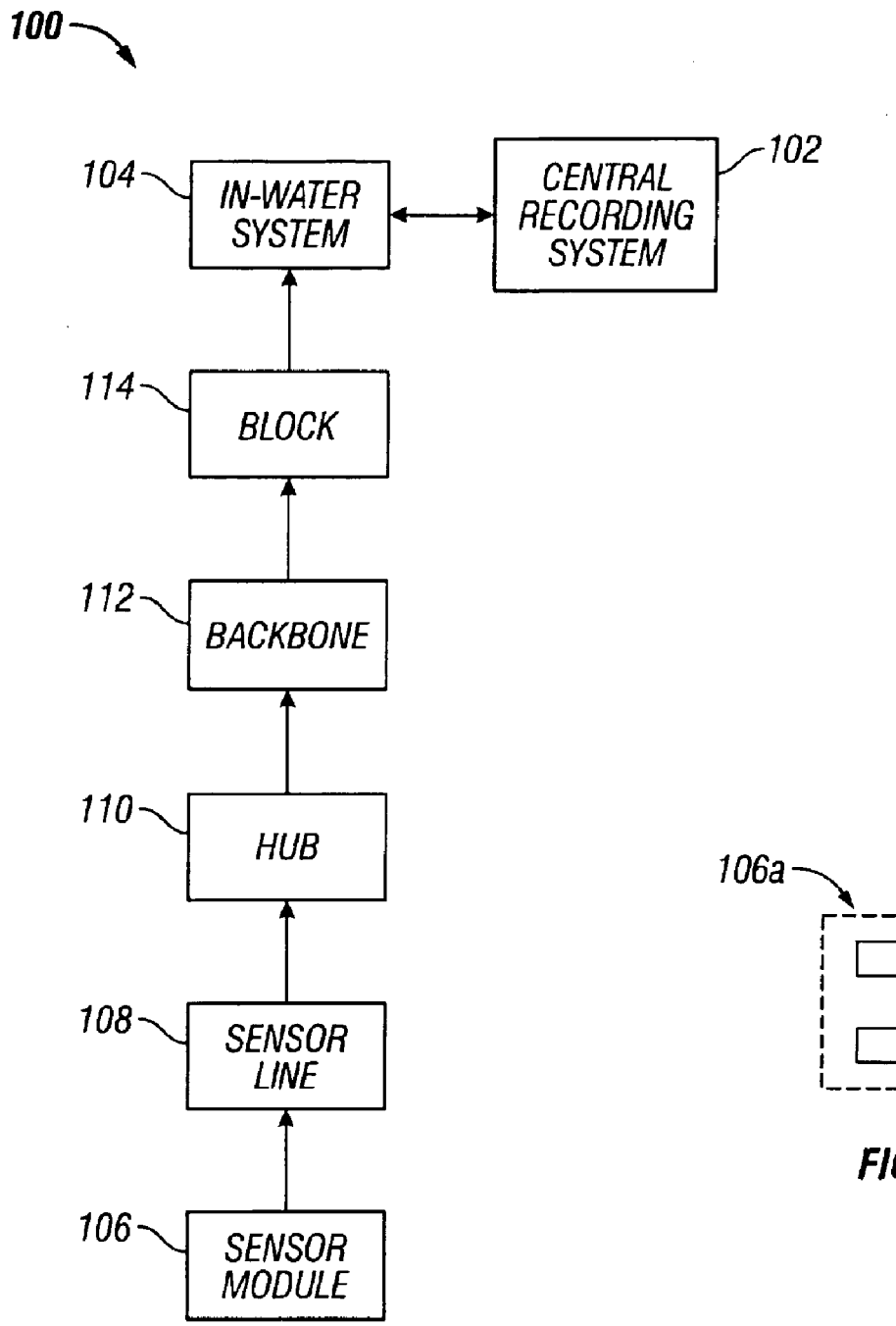
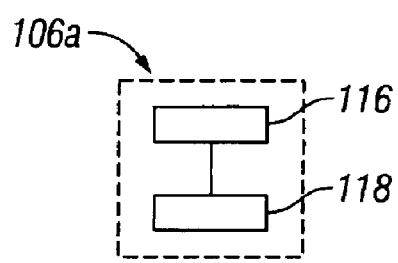
FIG. 1A
FIG. 1B

PERMANENT SEAFLOOR SEISMIC RECORDING SYSTEM UTILIZING MICRO ELECTRO-MECHANICAL SYSTEMS SEISMIC SENSORS AND METHOD OF DEPLOYING SAME

CROSS-REFERENCE TO RELATED APPLICATION

This application is related to provisional patent application 60/412,888 filed on Sep. 23, 2002 titled "Permanent Seafloor Seismic Recording System Utilizing Micro Electro-Mechanical Systems Seismic Sensors And Method of Deploying Same" the entire contents of which is hereby incorporated herein by reference.

BACKGROUND OF THE INVENTION

1. Field of the Invention present invention relates generally to seismic data acquisition apparatus and methods and more particularly to a permanently deployed multicomponent seafloor seismic data acquisition system.

2. Description of the Related Art the oil and gas industry wells are often drilled into underground formations at offshore locations. Once a well is successfully drilled, oil, gas, and other formation fluids can be produced from the formation. It is desirable during production to monitor formation parameters on a relatively continuous basis in order to effectively manage the field. Monitoring is performed using an array of seismic sensors located on the seafloor. Monitoring might be passive or active. In passive monitoring sensors detect seismic events without having the system induce the seismic event by introducing acoustic energy into the earth. Active monitoring as achieved when an acoustic energy source, e.g., an air gun, explosives, etc. is used to induce the seismic event.

The acoustic energy is detected by the sensor array and the array output is recorded at a central recorder for later processing and/or assessments of the field parameters.

Typical seafloor monitoring systems suffer from several disadvantages. The typical system is not expandable, thus the typical system is usually deployed at the system level and then tested for proper operation. Any failure is detected only at the system level thereby making troubleshooting and repair difficult and costly.

Another disadvantage in a non-expandable system is that changes in system layout and size are usually impossible without redesigning the entire system. Moreover, an existing system would require costly rework in order to expand the system.

Another disadvantage in the typical seismic monitoring system is high deployment costs. The cables associated with the typical system are large and expensive to deploy.

SUMMARY OF THE INVENTION

The present invention addresses the above-noted deficiencies in the typical production well monitoring system by provided a system and sub-systems that are simple to deploy, operate and maintain.

Provided is a permanent seafloor seismic recording system utilizing Micro Electro-Mechanical Systems seismic sensors. The system includes an expandable backbone, one or more expandable hubs and expandable sensor lines. The sensor lines include multiple sensor modules, each sensor module including one or more multi-component sensors. Each multi-component sensor might include a 3-C accelerometer and a hydrophone for providing a 4-C sensor output signal.

In one aspect of the invention, the system operates in a passive monitoring mode.

In another aspect of the present invention, the system includes an acoustic energy source for operating in an active mode.

In another aspect of the invention a method of assembling a permanent seafloor seismic data acquisition apparatus comprises assembling one or more sensor modules to form one or more sensor lines. The one or more sensor lines are assembled to form one or more sensor hubs. The one or more sensor hubs are assembled to form one or more sensor backbones, and the one or more sensor backbones are assembled to form one or more sensor blocks. The one or more sensor blocks are then deployed at a seafloor location.

In one embodiment, testing at the node level is performed prior to the next assembly phase and/or prior to deployment of the blocks. Each block might be tested during deployment.

BRIEF DESCRIPTION OF THE DRAWINGS

The novel features of this invention, as well as the invention itself, will be best understood from the attached drawings, taken along with the following description, in which similar reference characters refer to similar parts and wherein:

FIGS. 1A–1B illustrate a system according to the present invention as functional block diagrams showing in-water architectural components and a central controller;

DETAILED DESCRIPTION OF THE INVENTION

Figure 2:
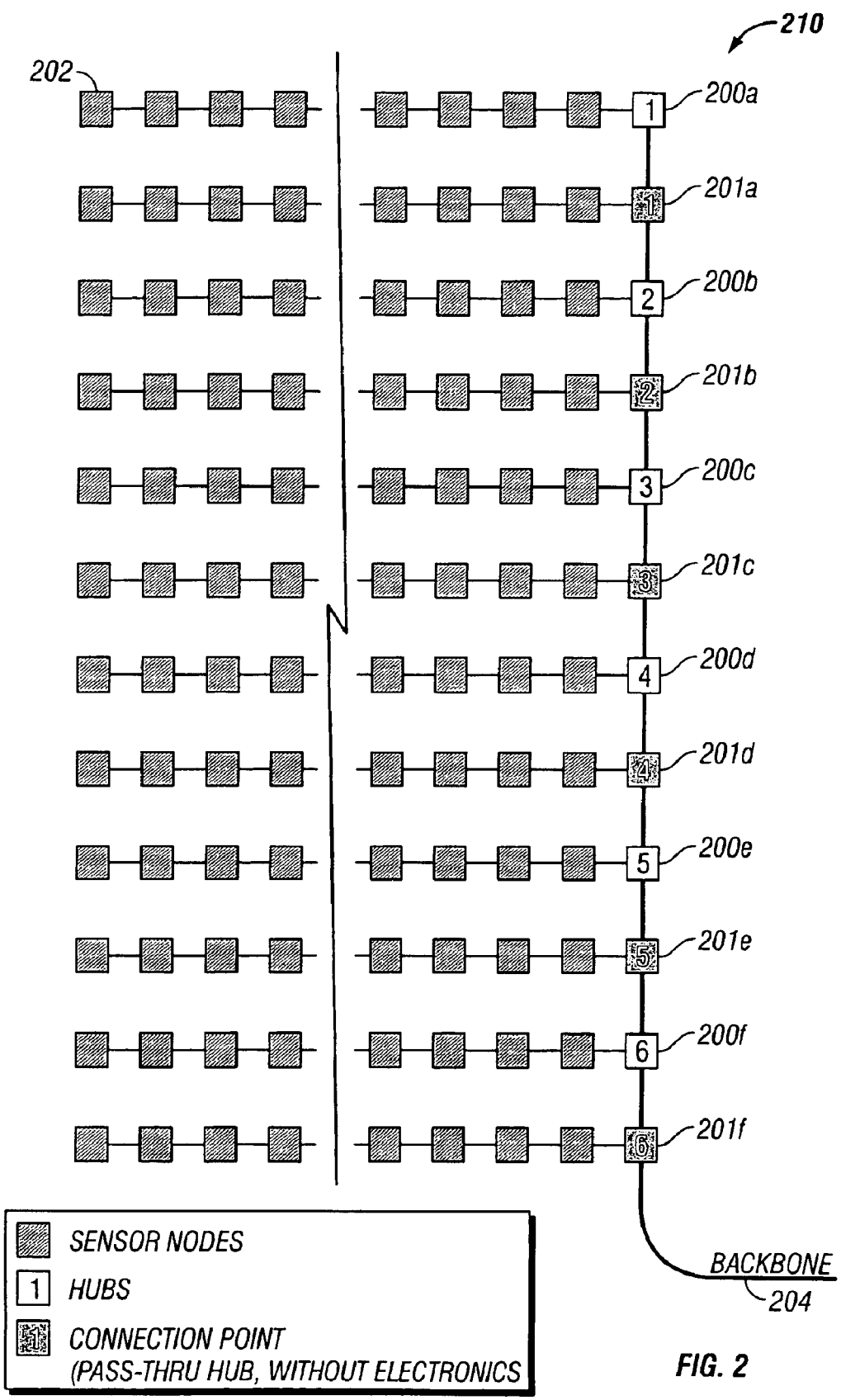
FIG. 2 is a schematic representation of a single node sensor block according to the present invention.

FIG. 1A is a block diagram showing a system 100 according to the present invention. The system 100 includes a central recording system 102 coupled to several in-water components referred to collectively as an in-water system 104. The system 100 according to the present invention is a modular design including the in-water system 102. The in-water system includes a plurality of sensor modules 106 coupled together to form a sensor line 108. Multiple sensor lines 108 are coupled to form a hub 110. And one or more hubs 110 form a backbone 112. The backbone 112 is then arranged in a block 114. These components are further described below.

As shown in FIG. 1B, the sensor modules 106 are preferably 4-component ocean bottom sensor modules 106a that are each populated with three micro-electro mechanical systems ("MEMS") accelerometers 116 orthogonally arranged in a precisely manufactured mounting block. The accelerometers are coupled to a single high output hydrophone 118. MEMS sensors exhibit performance attributes that inherently deliver higher fidelity seismic data. These sensors are not gimbaled and thus do not suffer the mechanical noise and orientation problems inherent with a gimbaled sensor design. The sensors have the unique ability of collecting gravity data to establish each sensor's inclination. The inclination information is stored in a record header and the raw data are rotated from an actual coordinate system to a common coordinate system as the first step in a data processing sequence. The inclination data are collected on every record.

The system of the present invention operates in two modes to enhance operational efficiency. An active operational mode is used to collect seismic information relating to an active (i.e., known) seismic source such as an air gun or explosive charge. A second operational mode is a passive operational mode used to collect natural seismic information and seismic information relating to equipment noise. When the system 100 is deployed, the operator will be able to collect seismic information relating to both active production seismic surveys and to passive micro-seismic monitoring operations with the same system and configuration.

Other than inclement weather, the most problematic elements of any marine or OBS survey are the cables and sensors. The telemetry provided by the present invention supports very large recording spreads. However, the design simplicity is not at the expense of power or signal transmission redundancy. Depending upon the water depth and mean-time-between-failure ("MTBF") requirements, redundancy is easily added to the system due to the modularity of the in-water components.

A "one size fits all" philosophy does not work well in the permanent seafloor recording segment of the seismic surveying industry. With a permanent only cable design, the present invention significantly reduces the overall cost and equipment volume of the system. Re-deployable cables are far too expensive in permanent settings and redundancy can add significant costs in cases where it is sometimes unwarranted.

The present invention is preferably modular and supports a "building block" or node architecture deployment methodology to provide system flexibility and scalability. Node architecture according to the present invention allows the ability to deploy and test a small portion of the overall system before deploying the entire system. Because the nodes are quite repeatable and scalable, very large systems can be constructed without re-engineering for larger or smaller deployments. Redundancy is also added without further need for redesign. The only design changes relate to requirements relating to a particular field.

As noted above and shown in FIG. 1B, the sensor module 106a includes a three-component accelerometer 116 and a hydrophone 118. The module 106a is disposed in a housing adapted for ocean-bottom use as is understood by those skilled in the art. The sensor module for this system does not require a magnetic heading sensor or an acoustic ranging system, although such sensors could be incorporated without departing from the scope of the present invention.

As mentioned, the multi-axis accelerometer 116 is used to gather gravity ("steady-state acceleration") data that are used to determine the sensor's inclination. The hydrophone 118 is used in a 4-component module 106a to provide additional signal data in order to properly understand the sensor module output. Data acquired by the hydrophone 118 are also used to remove acoustic signals reflected from the water surface known as ghost signals and to remove other unwanted signal multiples known to exist in seismic surveying.

The accelerometers are preferably MEMS sensors, because these sensors have several advantageous characteristics. MEMS sensors provide, for example, immunity from EMI emissions, linear frequency response from DC to ¾ Nyquist at 1, 2, and 4 ms sample rates, a linear phase response, and ultra low distortion. MEMS sensors also provide substantially identical channel to channel transfer function, high cross axis isolation (>46 dB), and high vector fidelity (>40 dB signal separation). Moreover, a three-axis sensor is non-gimbaled and thus is not limited by tilt, the angle of inclination with respect to vertical, because vertical orientation is self determined and preserved in the trace header.

Power and telemetry circuits in the sensor module are bi-directional. Therefore, the module can receive power and command and control signals from the central recorder 102, and the sensor module 106 can transmit seismic information to other sensor modules and/or to the recorder 102. Bi-directional communication provides redundancy and fault tolerance.

To achieve high reliability with low cost, the cable termination at each end of the sensor module is preferably factory terminated, i.e., non-removable and hermetically sealed. The termination preferably does not employ a connector that can be opened in the field, although such a factory termination is not required to realize the advantages of the present invention.

In one embodiment of the present invention, the position and location of the sensor modules are preferably determined using a remotely-operated vehicle ("ROV") upon the deployment of each individual sensor. At the onset of operations, the sensor location will be reconfirmed with the use of acoustic first arrival positioning techniques.

The sensor lines 108 comprise a string of sensor modules 106 connected together on a single power and telemetry circuit. The telemetry preferably supports various data rates depending on the distance between nodes and the size and capacity of the conductors. A power distribution circuit (not separately shown) provides power along sensor lines. The power distribution circuit delivers the power required for each sensor line while preferably applying less than 600 VDC to the line.

A bulk cable for the sensor lines includes a heavy-duty polyurethane jacket and an internal stress core. An internal stress core provides lower bulk cable cost and lower cost of termination. One end of each sensor line is terminated in a connector capable of mating and de-mating in a wet environment. This connector is used to mate the sensor lines to the backbone hubs 110.

The hubs 110 provide two or more sensor lines with access to the backbone 112. Each hub 110 receives power from a backbone high voltage power trunk and distributes the power as controlled power to the sensor lines. Additionally, the hubs 110 provide a telemetry portal for the sensor lines for interfacing with a backbone telemetry that might be up to 100 Mbit/sec transfer rate.

The hubs 110 further provide a mating half for the wet connector used to terminate the sensor lines. Once the sensor lines are placed on the seafloor, the sensor lines are connected to the hubs 110 by joining the wet connector pairs. Again, for a good reliability/cost ratio, the cable termination at each end of the hub 110 is factory terminated. The termination does not use a connector that can be opened in the field.

The backbone 112 comprises of a string of hubs 110 that are connected together on a single power and telemetry circuit. Backbone telemetry is preferably based on Fast Ethernet (100 Mbit/sec) telemetry. The backbone telemetry of the present invention supports up to about 600 sensor modules ("stations").

The power system for the backbone 112 preferably includes a high voltage power trunk to deliver power to the sensor lines and a lower voltage power system to power the hubs. The backbone 112 according to the present invention does not require redundant circuits. Nevertheless, the system design can easily accommodate redundancy as desired.

The sensor block 114 is a building block that includes a plurality of sensor modules, sensor lines, hubs, and a backbone. The sensor block 114 includes a collection of sensors that fully utilize the telemetry bandwidth available on a single backbone 112. The present invention provides up to 600 or more 4-C sensor stations per block.

FIG. 2 is a schematic representation of a single node sensor block 210 according to the present invention. Shown are sensor modules 202 arranged as sensor nodes. Lines of sensor nodes are coupled to a corresponding hub 200a–f. In some cases, lines of sensor nodes 202 might be connected to a corresponding pass-through hub 201a–f, which is simply a hub without processing electronics to provide a connection point. Thus, a hub 200 will process information and provide power and telemetry to two lines of sensor nodes by using a pass-through hub 201. The hubs 200, 201 are then coupled to form a backbone node 204. The backbone node can thus be connected to a central recorder as a single block 210, or the node 204 might be connected to other backbones for scaling the system using multiple blocks 210.

Figure 3:
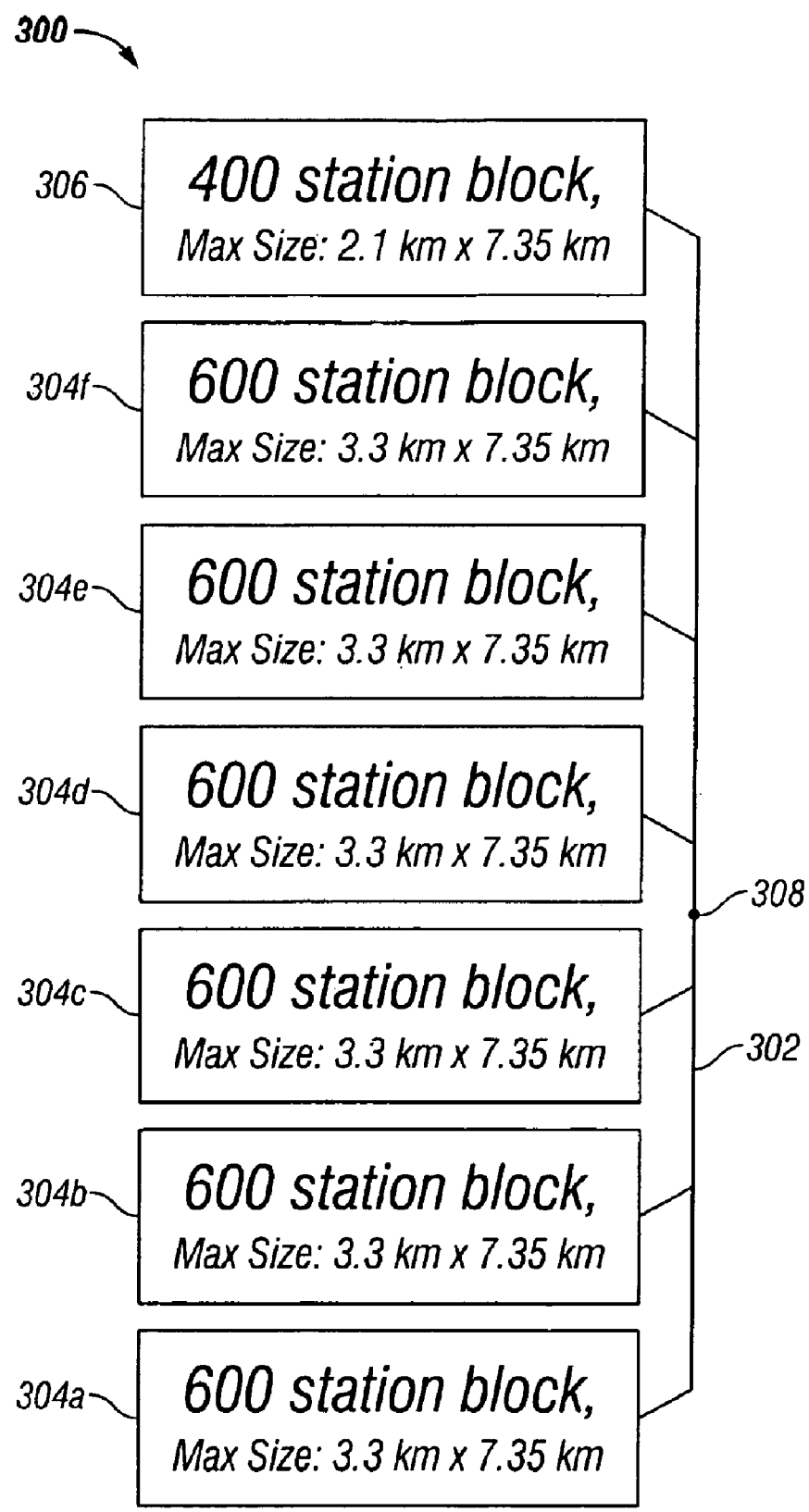
FIG. 3 is a block diagram to illustrate multiple sensor blocks arranged according to the present invention.

FIG. 3 is a block diagram to illustrate multiple sensor blocks arranged according to the present invention. Shown is one embodiment of a sensor block 300 according to the present invention. The sensor block 300 might comprise, for example six sensor station blocks 304a–f of 600 sensor nodes ("stations") and a sensor station block 306 comprising 400 sensor stations. The seven sensor blocks are coupled to form a 4000 sensor station backbone 302 having a junction point 308 for further scalability or connection to a central recording system.

Figure 4:
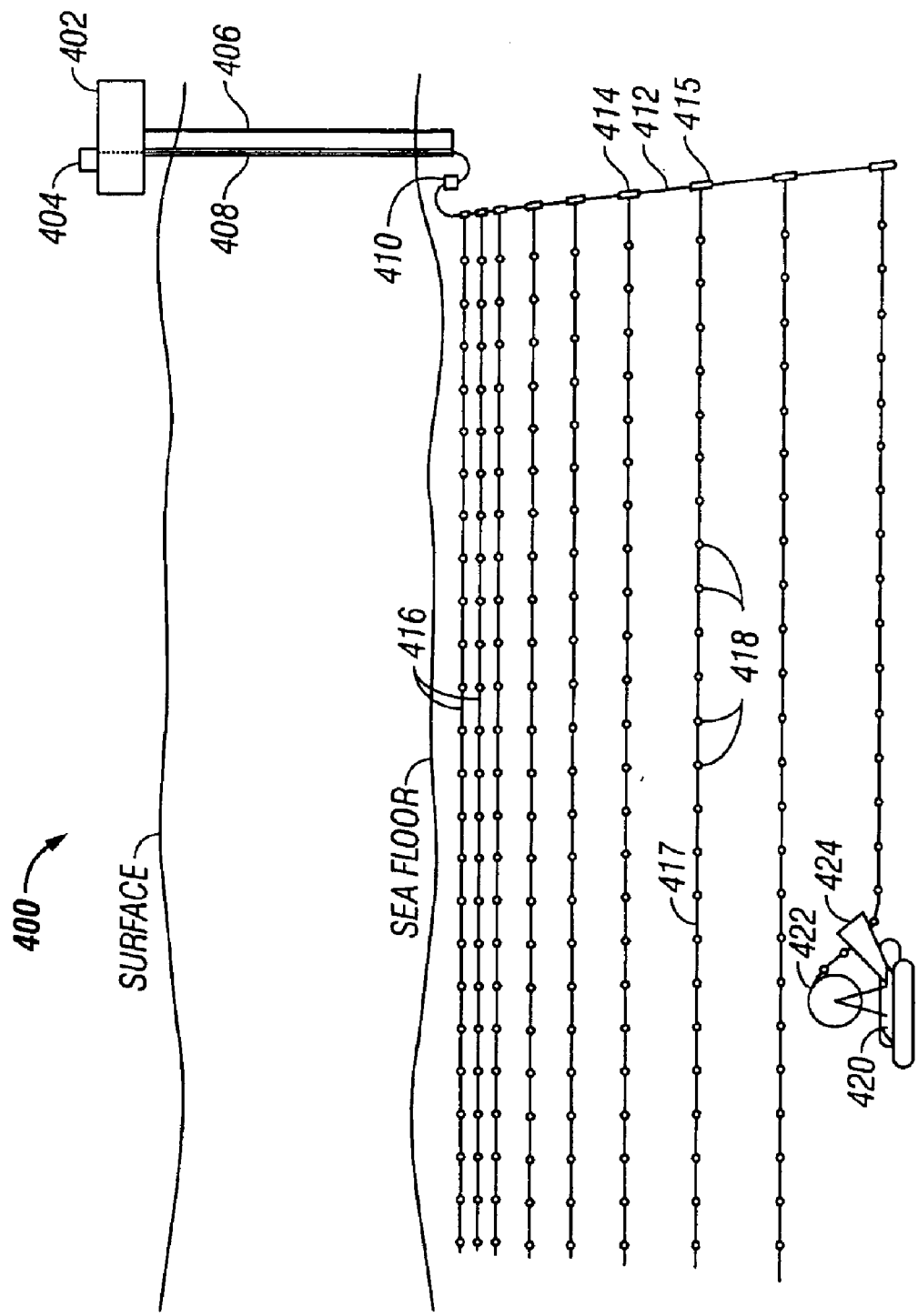
FIG. 4 is an elevation view of a single block ocean bottom seismic array system according to the present invention.

FIG. 4 is an elevation view of a system 400 according to the present invention. The system 400 is shown as a single block ocean bottom seismic array for simplicity. As described above and shown in FIGS. 1–3, a system according to the present invention can be scaled to multiple blocks. A central recording system 404 is disposed out of water, typically on a platform, Floating Production, Storage and Offshore Loading (FPSO) or other fixed or semi-fixed support structure 402 located at the sea surface. The central recording system 402 is coupled to an expandable backbone 412 at a primary junction point 410. The backbone 412 comprises a plurality of hubs 414 coupled together using wet connectors 415 for seafloor deployment. Each hub 414 is coupled to a sensor line 416 using the same or similar wet connector 415. Each sensor line comprises a plurality of 4-C sensor modules 418 coupled via ocean cabling 417 and connectors 415.

Figure 5:
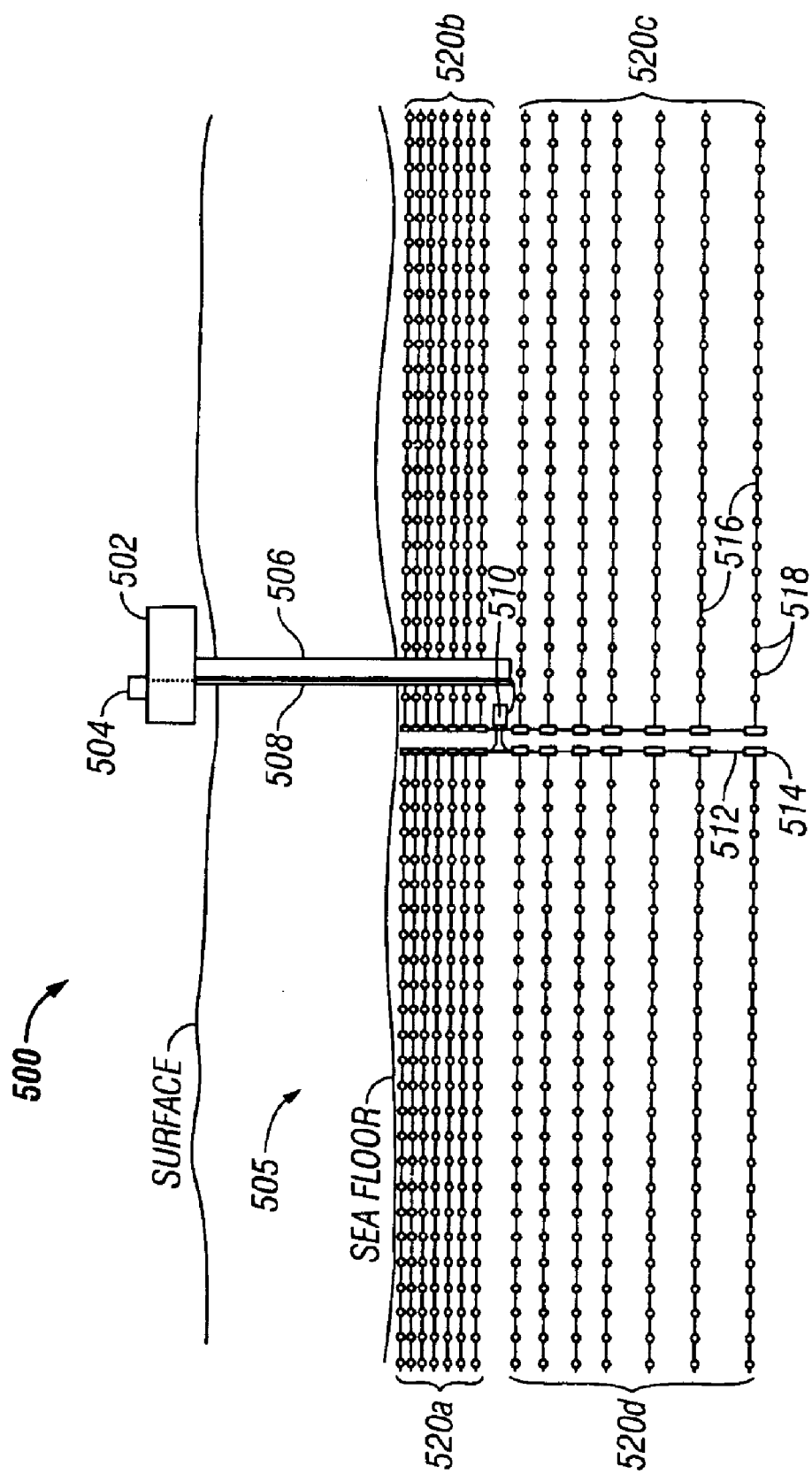
FIG. 5 is an elevation view of a multi-block ocean bottom array system according to the present invention.

FIG. 5 illustrates the ability to expand the system of FIG. 4 provided by the present invention to a multi-block system 500 using essentially identical system components described above and shown in FIG. 4. The system 500 includes a central recording system 504 disposed at the sea surface on a platform 502. The central recording system is coupled to a block 505 via a cable 508 following a riser 506 that leads from the platform 502 to the seafloor and couples the block 505 at a junction point connector 510. The block 505 comprises a backbone 512 of hubs 514. The backbone architecture is shown expanded to as four connected single sensor blocks. Each single sensor block is joined at the primary junction 510 for transmitting data to the surface central recorder 504.

As described above and shown in FIGS. 1–4, the hubs 514 are tested at a node level prior to assembly and deployment. Sensor modules 518 of one or more 4-C sensors are assembled and tested. Sensor modules 518 are assembled and tested as lines 516, and the lines 516 are then tested as single blocks 520a–d. The block level can be tested at assembly, they might also be tested at the survey site just prior to deployment, or they might be tested once deployed on the seafloor.

The invention described above and shown in FIGS. 1–5 is a modular permanent seafloor seismic recording system utilizing MEMS technology and expandable system architecture. For any deployment, the actual configuration would be defined as part of an engineering effort, specific to a particular field. Deployments of more than a single 600-station system would use multiple blocks. Each block is a functional stand-alone unit, which connects to the backbone at a common tie back point or ("junction"). Using this architecture allows large and complex systems to be built without increasing the complexity of the building blocks. An exemplary 600-station block is described above and schematically shown in FIG. 2.

Using the architecture of FIG. 2, an exemplary array of 50 stations with 150 m station spacing, would have a total of 4000 stations in 6 ⅔ blocks as shown in FIG. 3. Similarly, the array defined by 150 stations with 50-meter station spacing, would have a total of 12000 stations and would use, for example 20 blocks.

The lead-in cable for a system according to the present invention extends from the central recording system to the seafloor and connects to the backbone. In one embodiment, the lead-in cable comprises fiber optic data paths and/or wire conductors.

In a preferred embodiment, the central recording system 102, 404, 504 is a scalable design using primarily off-the-shelf components to provide flexibility in system size and low cost. The central recording system is used for recording data in both a continuous (passive) mode and a production (active) seismic source mode. For both modes, the system is capable of recording indefinitely with only the need for changing full disk and tape storage systems. A scalable recording system according to the present invention is capable of supporting up to 2400 channels in one block (600×4C stations or one block). For each additional 2400 channels, additional off-the-shelf hardware would be integrated into the existing recording architecture.

In a preferred embodiment, the central recording system is located at a surface location on, for example, a production platform or on a Floating Production, Storage and Offshore Loading (FPSO).

In another embodiment of the present invention the central recorder further includes wireless telemetry for transmitting data to a remote location. For example, the central recorder might be linked to a central command station such as a company headquarters. The link might be established using any number of communications techniques, such as satellite communication directly to the remote location, or the data might be linked to a network via known wireless telemetry methods, and the remote command center then access the data using known networking protocols.

In a preferred embodiment the sensor lines do not require armoring. Thus a deployment method according to the present invention includes using remotely operated vehicles (ROV) 420 to deploy the cables. A cable line is attached to a reel 422 mounted on a ROV. The ROV 420 includes a trenching tool 424 for laying the sensor cable while trenching. All control is remotely transmitted to ensure crew safety. Any other ocean bottom deployment method that may be suitable for deploying a non-armored array cable is suitable for the purposes of the present invention.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

What is claimed is:

1. A permanent seafloor seismic data acquisition apparatus, comprising:
    a sensor block deployed on a seafloor for gathering seismic information,
    the sensor block having a node architecture including;
        a backbone;
        a hub; and
        one or more sensor modules, wherein the one or more sensor modules form one or more sensor lines, and wherein the one or more sensor lines being mated at the deployed location to form the hub, each of the sensor modules, sensor lines, hub and backbone forming a node of the apparatus and wherein the sensor block is expandable to vary a block size by adding one or more additional substantially similar nodes using a substantially similar node architecture.

2. The apparatus of claim 1, wherein the one or more sensor modules are disposed along a sensor tine trenched to in the seafloor.

3. The apparatus of claim 1, wherein the one or more sensor modules include a multi-axis accelerometer.

4. The apparatus of claim 3, wherein the multi-axis accelerometer includes a 3-C accelerometer.

5. The apparatus of claim 4, wherein the one or more sensor modules further comprise a hydrophone disposed in a housing for providing a 4-Component output signal from the one or more sensor modules.

6. The apparatus of claim 1 further comprising a central recorder disposed at a surface location and coupled to the backbone.

7. The apparatus of claim 1 further comprising a cable including a wire conductor for transferring data from the one or more sensor modules to the backbone.

8. The apparatus of claim 1 further comprising a cable including an optic fiber for transferring data from the one or more sensor modules to the backbone.

9. The apparatus of claim 1, wherein the backbone, hub, and sensor modules are remotely deployable on the seafloor.

10. The apparatus of claim 1 further comprising a remotely operated vehicle for deploying the backbone, hub, and sensor modules at the seafloor.

11. A system for seismic data acquisition comprising:
    a surface controller controlling the system; and
    a permanent seafloor subsystem comprising a sensor block deployable on a seafloor for gathering seismic information, the sensor block having a node architecture including;
        a backbone in communication with the surface controller;
        a hub; and
        a one or more sensor modules, wherein the one or more sensor modules being mated at the deployed location to form one or more sensor lines, and wherein the one or more sensor lines form the hub, each of the sensor modules, sensor lines, hub and backbone forming a node of the apparatus and wherein the sensor block is expandable to vary a block size by adding one or more additional substantially similar nodes using a substantially similar node architecture.

12. The system of claim 11 further comprising an acoustic source for providing acoustic energy, the acoustic energy being sensed by the sensor one or more modules.

13. The system of claim 11 further comprising a wet connector to provide system scaling.

14. The system of claim 11, wherein the backbone comprises a plurality of hubs.

15. The system of claim 11 , the hub comprises at least two sensor lines, each sensor line having a plurality of sensor modules attached thereto.

16. The system of claim 11, wherein the one or more sensor modules include a multi-component sensor.

17. The system of claim 11, wherein the one or more sensor modules include a multi-component MEMS accelerometer.

18. The system of claim 11, wherein the one or more sensor modules further comprise a hydrophone in an underwater housing.

* * * * *